US006111772A

United States Patent [19]
Lee et al.

[11] Patent Number: 6,111,772

[45] Date of Patent: Aug. 29, 2000

[54] UNIVERSAL, VOLTAGE VARIABLE, SAFETY ENHANCED ELECTRIC CONNECTOR

[76] Inventors: Chiu-Shan Lee; S. S. Chen Li, both of No. 31, Lane 18, Chang-Chun Rd, Hsintien City, Taiwan

[21] Appl. No.: 09/342,196

[22] Filed: Jun. 29, 1999

[51] Int. Cl.[7] ........ H02M 1/00

[52] U.S. Cl. ........ 363/146; 363/100; 439/651

[58] Field of Search ........ 439/651, 652, 439/717, 928, 956; 363/146, 142, 143, 100; 323/318

[56] References Cited

U.S. PATENT DOCUMENTS 4,659,161 4/1987 Holcomb ........ 439/652

*Primary Examiner*—Shawn Riley
*Attorney, Agent, or Firm*—Rosenberg, Klein & Lee

[57] ABSTRACT

A universal, voltage variable, safety enhanced electric connector system is provided. Each connector in the system includes a housing, an electric plug and receptacle disposed at opposite side walls of the housing, and power supply circuit means disposed within the housing and connected between the electric plug and receptacle. The power supply circuit means includes a voltage transformer for converting an input power supply voltage into high and low voltage AC power supplies. It also includes the rectifier for converting AC power supply voltage into DC power supply voltage, as well as an AC voltage regulator, a DC voltage regulator and a DC output jack coupled to the rectifier. At least one insertion slot corresponding to one of the transformer voltage outputs in formed on a left side wall of the housing with a pair of metal contact plates provided therein. At least one metal blade is disposed and a right side wall of the housing for corresponding engagement with an insertion slot in another connector formed in accordance with the present invention. A plurality of electric connectors may be interconnected by inserting the electric plug of one to the electric receptacle of another and at least one metal blade of one connector to at least one insertion slot of another, such that the AC power supply voltage is at one connector is conveyed to other.

14 Claims, 6 Drawing Sheets

UNIVERSAL, VOLTAGE VARIABLE, SAFETY ENHANCED ELECTRIC CONNECTOR

BACKGROUND OF THE INVENTION

The present invention relates to a universal, voltage variable, safety enhanced electric connector, and more particularly to such a universal, voltage variable, safety enhanced electric connector which provides AC as well as DC power supply at different voltage values.

U.S. Pat. No. 5,885,100 discloses an electric adapter having electric plug means at one side and electric receptacle means at an opposite side. By inserting the electrical means of one electric adapter into the electric receptacle means of another, a number of electric adapters may be electrically connected in series. The electric adapter further comprises pairs of electric plug insertion holes for the insertion of any variety of electric plugs, and a sliding cover plate biased by spring means to automatically cover the electric plug insertion holes. This structure of electric adapter is functional; however, it is practical for one voltage output only. Further, this structure of electric adapter is designed for AC output only. When a DC power supply is needed, and AC to DC adapter must be used.

SUMMARY OF THE INVENTION

In is one object of the present invention to provide an electric connector which may be safely used.

It is another object of the present invention to provide an electric connector which provides AC power output as well as DC power output.

It is still another object of the present invention to provide a safety enhanced electric connector which may be regulated to selectively output AC/DC power supply at one of a series of voltage values.

It is still another object of the present invention to provide a variable voltage, safety enhanced electric connector which fits any of a variety of electric plugs.

According to one aspect of the present invention, the universal, voltage variable, safety enhanced electric connector comprises a housing; an electric plug and an electric receptacle disposed at two opposite side walls of the housing; and, power supply circuit means installed in the housing and connected between the electrical plug and the electric receptacle. The power supply circuit means comprises a voltage transformer for converting an input power supply into a high voltage AC power supply and low voltage AC power supply; a rectifier for changing AC power supply into DC power supply; an AC voltage regulator, and a DC voltage regulator. A DC output jack is formed on the housing at the top and connected to the rectifier for DC output. Two vertically spaced insertion slots are formed on the left wall of the housing, and two pairs of metal contact plates are respectively provided in the insertion slots. Two metal blades are provided at the right side wall of the housing so as to correspond to the insertion slots.

When two universal, voltage variable, safety enhanced electric connectors are connected together by inserting the electric plug of a first electric connector into the electric receptacle of the second, the metal blades at one electric connector are respectively inserted into the insertion slots at the other, enabling AC power supply to be transmitted from one electric connector to the other. The electric receptacle of the first electric connector may be electrically disconnected from its voltage transformer by removing the metal blades of the second electric connector from its insertion slots.

According to another aspect of the present invention, coaxial cable signal connector means and telephone signal module jack means may be provided at a face panel of the electric connector.

DETAILED DESCRIPTION OF THE PREFERRED EMBODIMENTS

Figure 1:
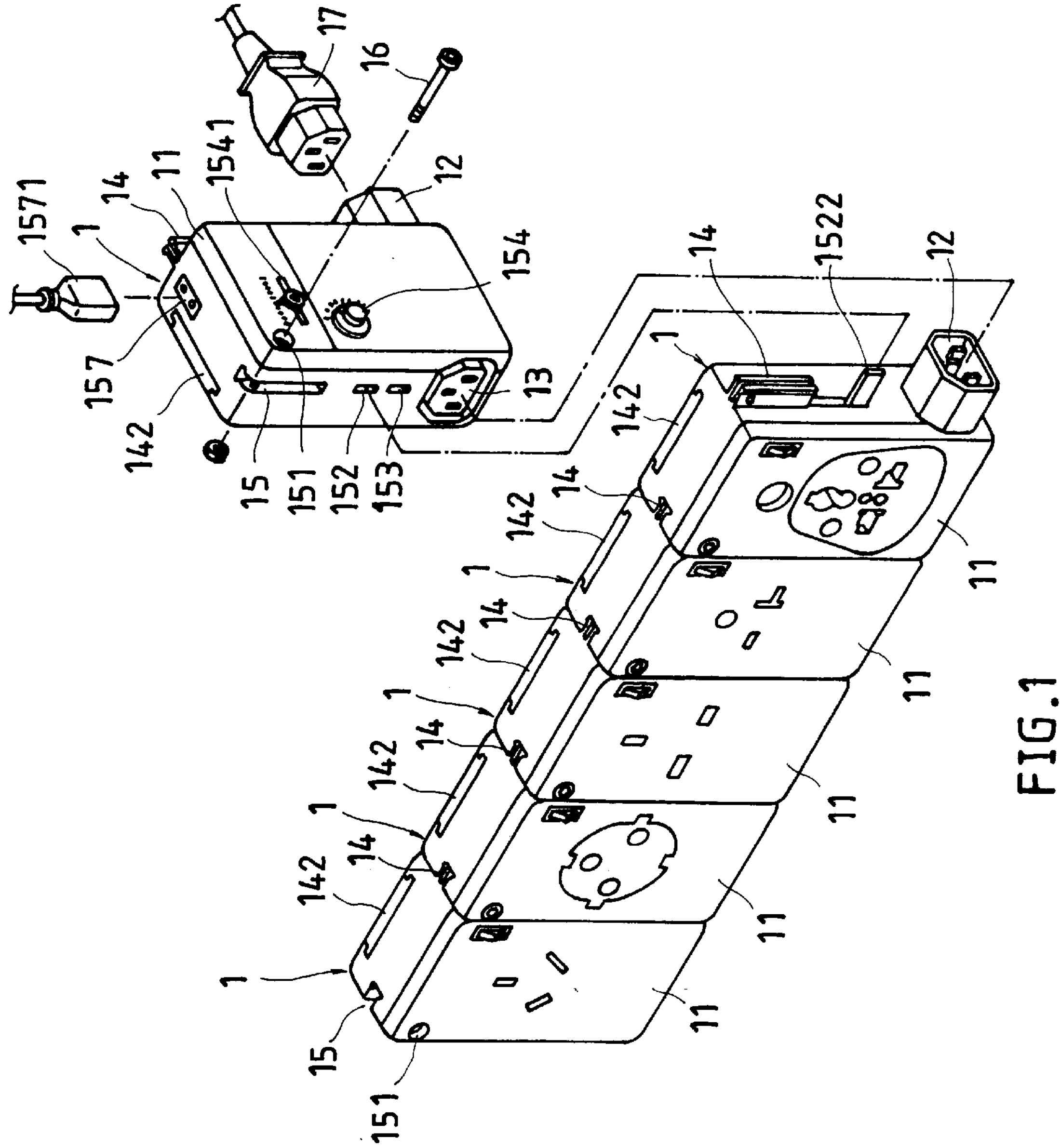
FIG. 1 is a perspective view illustrating the interconnection of a plurality of universal, voltage variable, safety enhanced electric connectors formed in accordance with a first embodiment of the present invention.
Figure 2:
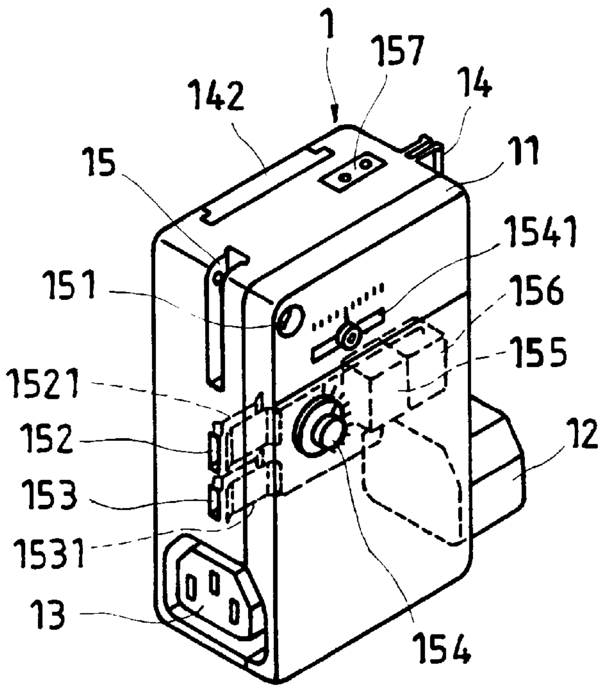
FIG. 2 is a front perspective view of a universal, voltage variable, safety enhanced electric connector formed in accordance with the first embodiment of the present invention.
Figure 3:
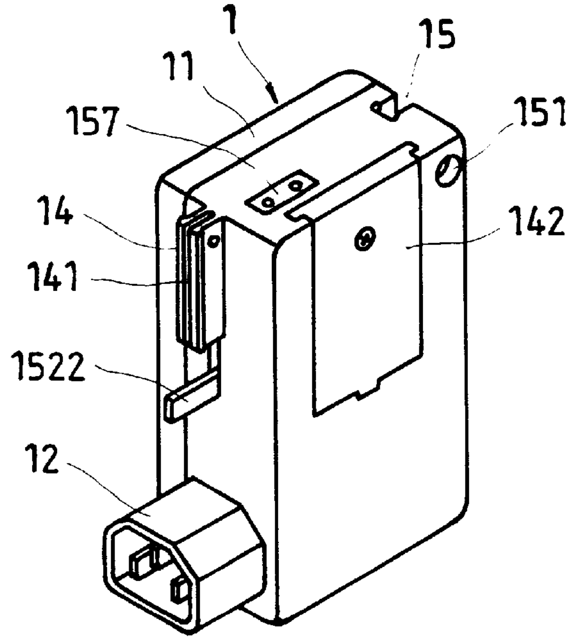
FIG. 3 is a back perspective view of the embodiment of the electric connector shown in FIG. 2.

Referring to FIGS. 1,2, 3, and 4, a universal, voltage variable, safety enhanced electric connector comprises a housing 1 having mounted therein a voltage transformer 155, a rectifier 156, and voltage regulator controls 154 and 1541. The connector is thereby adapted to provide AC/DC power supply at different voltage levels. Two vertically spaced insertions slots, namely, the upper insertion slot 152 and the lower insertion slot 153 are provided at one side wall, namely, the left side wall of the housing 1. A pair of metal contact plates 1521, 1531 is bilaterally mounted within each of the insertion slots 152 or 153. The plates 1521 are connected to a low voltage (for example, 125V) output terminal of the voltage transformer 155, while the plates 1531 are connected to a high voltage (for example, 250V) output terminal of the voltage transformer 155.

A receptacle 13 is formed on the housing 1 below the insertion slots 152 and 153, and electrically connected to the voltage transformer 155 through the metal contact plates 1521 and 1531 by an electric wire (not shown). When a metal blade is inserted into the upper insertion slot 152 or the lower insertion slot 153, the respective metal contact plate pairs 1521 or 1531 are electrically connected to close the current path between the voltage transformer 155 and the receptacle 13, allowing either the low or high voltage (125V or 250V) AC power supply output to be passed from the voltage transformer 155 to the receptacle 13 for output. After removal of the inserted metal blade from the insertion slot 152 or 153, the current path between the voltage transformer 155 and the receptacle 13 is opened, such that no power supply voltage is provided to the receptacle 13.

An elongated receiving slot 15222 is formed on one side wall—namely, the right side wall of the housing 1. A metal blade 1522 is pivotally coupled to the housing 1 for pivotal displacement between the operative position where the metal blade 1522 is perpendicularly extended out of the elongated receiving slot 15222, and the non-operative position where the metal blade 1522 is received inside the elongated receiving slot 15222. When two electric connectors are connected together, the metal blade 1522 of one electric connector is inserted into the other (low voltage) insertion slot 152 in the embodiment shown, to electrically contact the respective metal contact plates 1521 (alternatively, the metal blade 1522 may be designed in another embodiment for insertion into the lower insertion slot 153).

Different sets of auxiliary electric plug insertion holes 1523 are formed on a front side wall of the housing 1 for the insertion therein of a variety of electric plugs. Metal frames 1524 are mounted inside the housing 1 corresponding to the electric plug insertion holes 1523 for electrically receiving an electric plug inserted into the electric plug insertion holes 1523.

A DC output jack 157 is provided at the top side wall of the housing 1 for electric actuation responsive to a voltage regulator control 1541, such that the DC output may be regulated as desired.

Two parallel coupling plates 14 which are separated by a gap 141 are provided at the left side wall of the housing 1 near the top. A corresponding coupling hole 15 is provided at the right side wall of the housing 1 near the top. A through hole 151 is provided through the face panel 11 and back wall of the housing 1 across the coupling hole 15. The coupling plates 14 are configured to fit the coupling hole 15; such that in connecting together two electric connectors, the coupling plates 14 of one electric connector are inserted into the coupling hole 15 of the other. A screw bolt 16 is then installed through the coupling hole 151 and through a respective through hole formed in the coupling plates 14 to fixedly secure the two connectors together.

Figure 7:
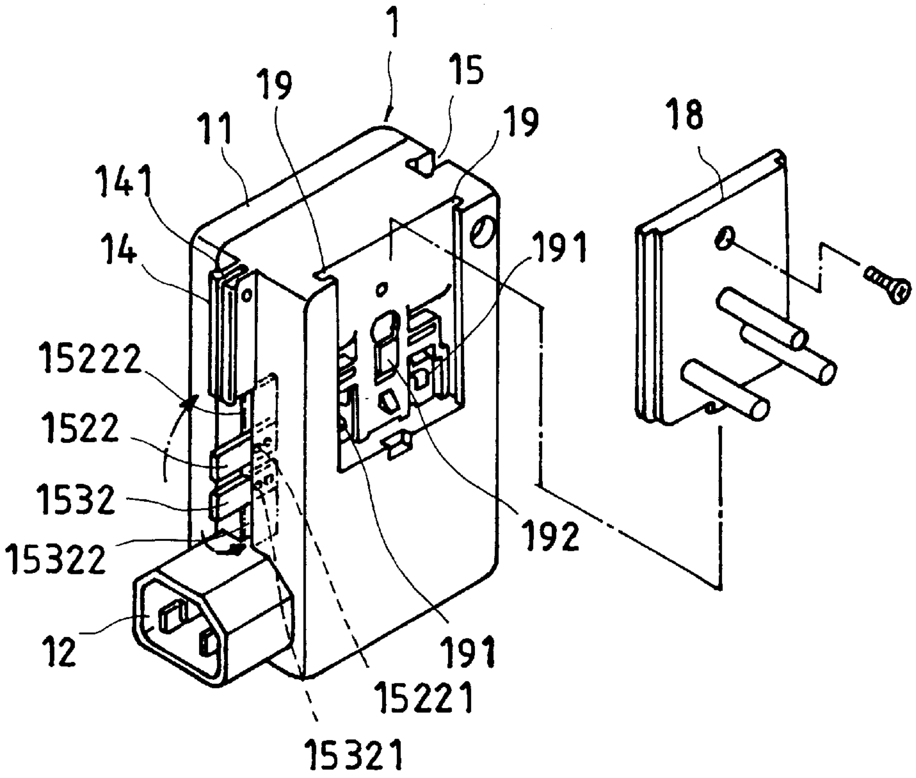
FIG. 7 is a perspective view of a connector formed in accordance with a fifth embodiment of the present invention.

The housing 1 further comprises a recessed track 19 at its back wall for receiving a detachable plug plate 18 (see FIG. 7). Positive and negative terminal metal contacts 191 and grounding metal contact 192 are provided in the recessed track 19 for providing power output through the detachable plug plate 18 received therein. In place of the detachable plug plate 18, a cover plate 142 may alternatively be inserted into the recessed track 19 to block the metal contacts 191 and 192. After installation, the cover plate 142 is kept flush with the outside wall of the housing 1.

Figure 4:
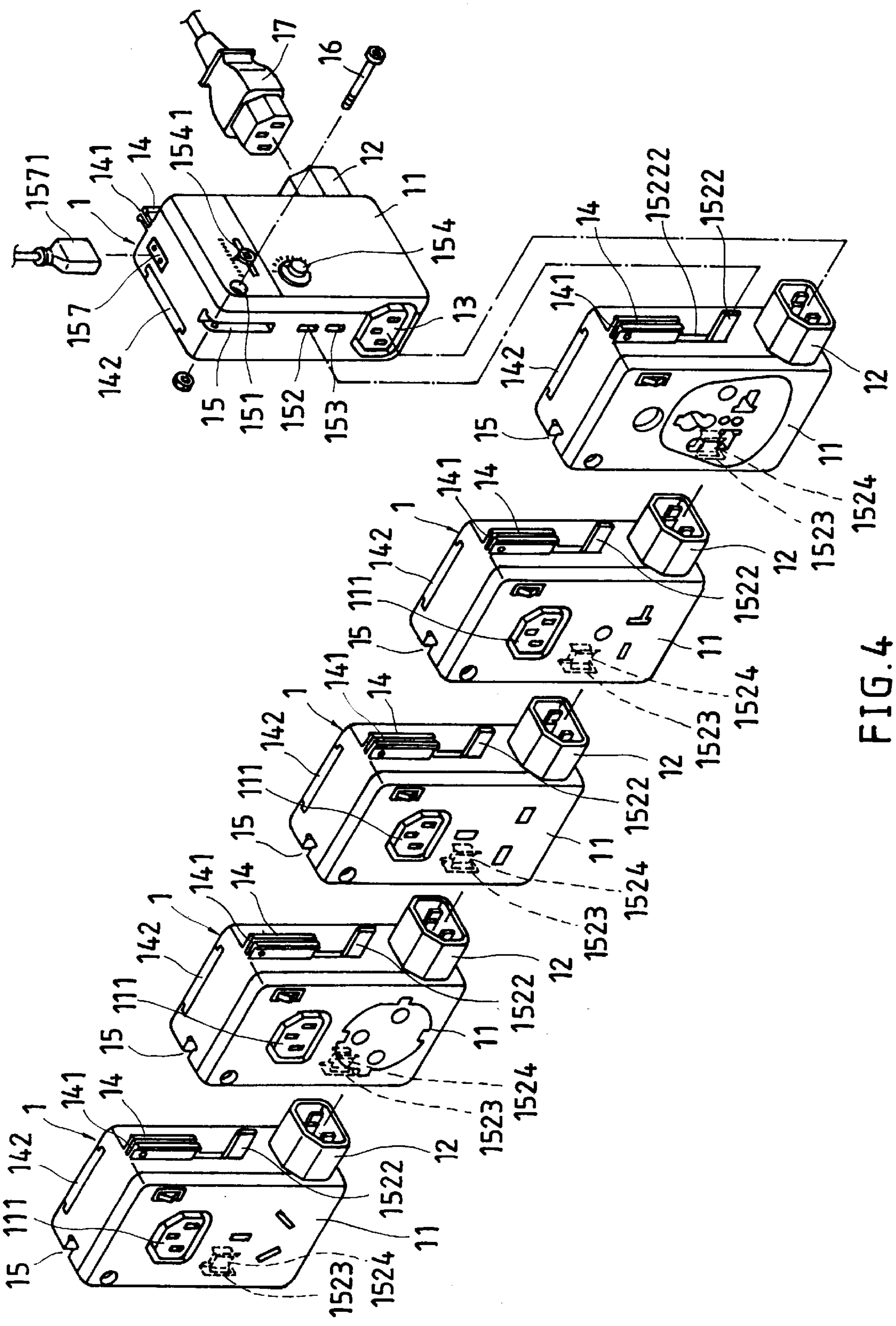
FIG. 4 is a perspective view of a plurality of connectors formed in accordance with a second embodiment of the present invention.

A second receptacle 111 may be provided at the face panel 11 of the housing 1 for receiving, for example, a computer cable (see FIG. 4).

Figure 5:
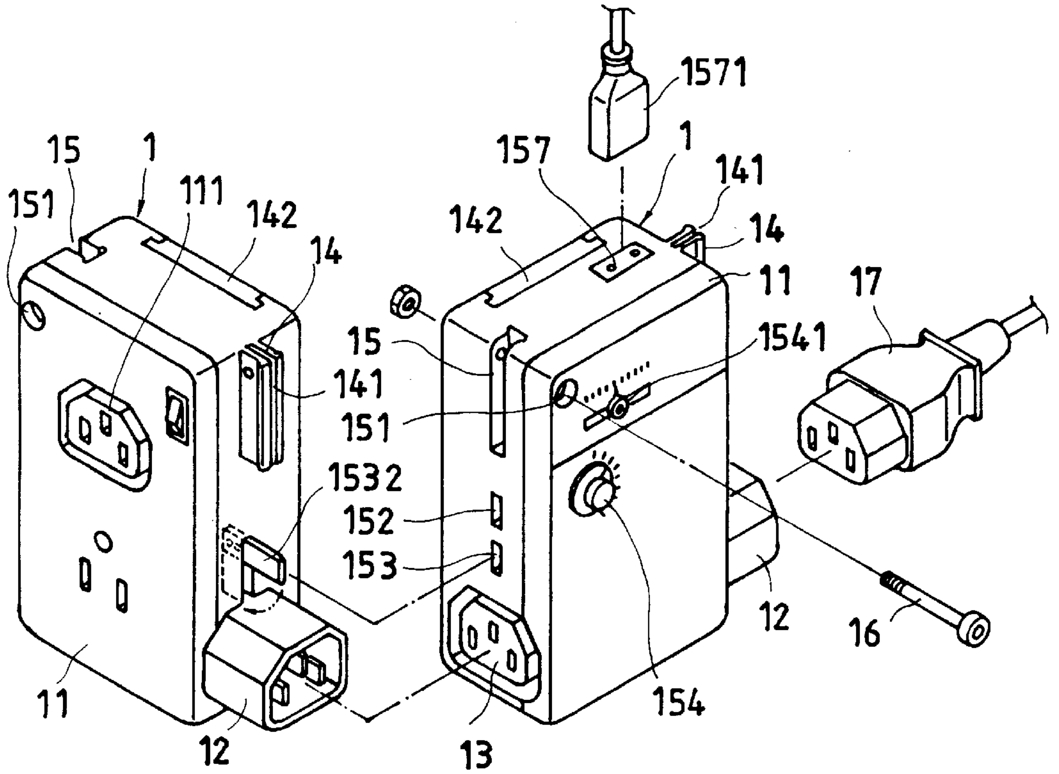
FIG. 5 is a perspective view of a plurality of connectors formed in accordance with a third embodiment of the present invention.
Figure 6:
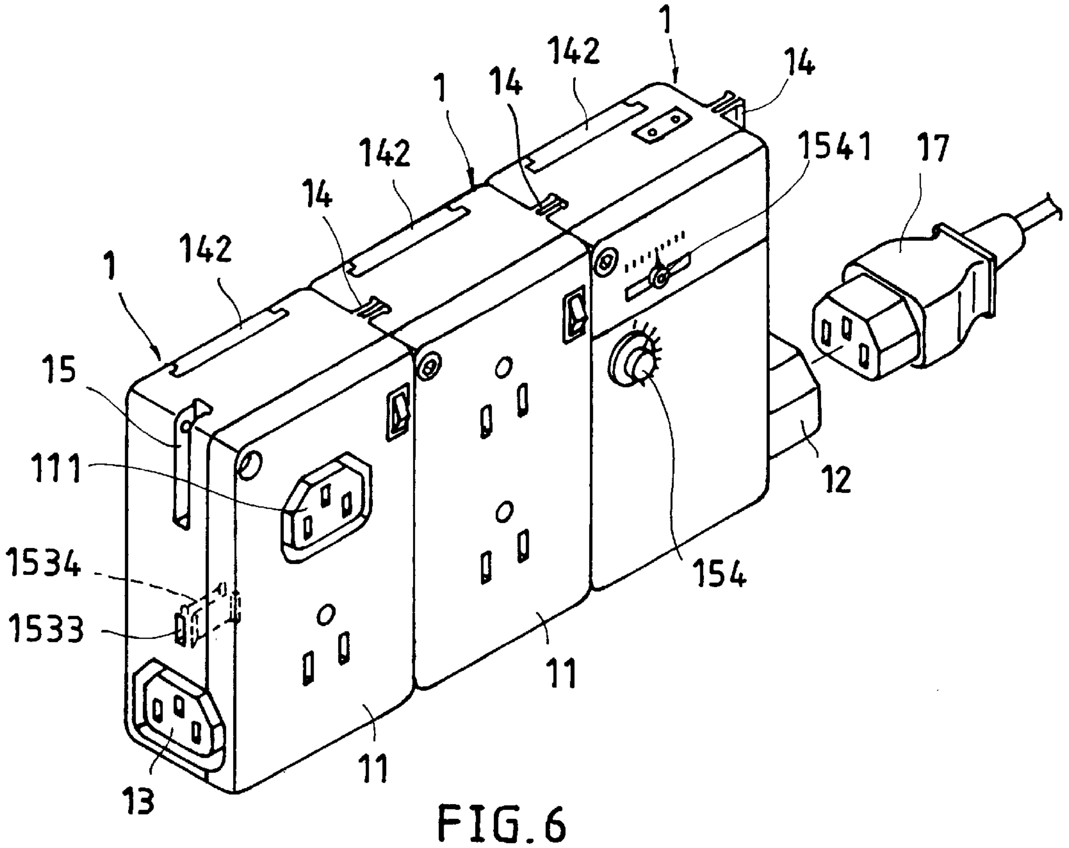
FIG. 6 is a perspective view of a plurality of connectors formed in accordance with a fourth embodiment of the present invention shown interconnected.

Referring to FIGS. 5 and 6, the electric connector may be configured with a receptacle 13 exposed at its left side wall, an insertion slot 1533 formed above the receptacle, a pair of metal contact metal plates 1534 mounted within the insertion slot 1533, an electric plug 12 disposed to protrude from its right side wall for receiving AC power supply from a cable 17, and a metal blade 1532 disposed above the electric plug 12. By inserting the electric plug 12 of one electric connector into the receptacle 13 at the left side wall of another electric connector, two electric connectors may be electrically interconnected. The metal plate 1532 is then inserted into either the insertion slot 1533 (see FIG. 6) or the insertion slot 153 (see FIG. 5), depending on the embodiment, enabling a high voltage AC power supply to be transmitted from one electric connector to the other.

As indicated in FIG. 1, when the voltage regulator control 154 is set to the low voltage position, and the metal blade 1522 of a second electric connector is inserted into the upper insertion slot 152 of a first electric connector to electrically contact the metal contact plates 1521, low voltage AC power supply is transmitted from the receptacle 13 of the first electric connector to the second electric connector through the second electric connector's electric plug 12. As indicated in FIG. 5, when the voltage regulator control 154 is set to the high voltage position, and the metal blade 1532 of a second electric connector is inserted into the lower insertion slot 153 of a first electric connector to electrically contact the respective metal contact plates 1531, high voltage AC power supply is transmitted from the receptacle 13 of the first electric connector to the second electric connector through the electric plug 12 of that second electric connector.

Figure 8:
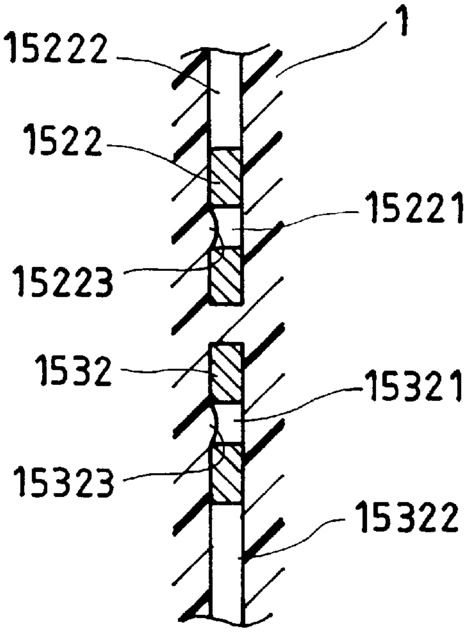
FIG. 8 is a sectional view in an enlarged scale of part of the housing, showing a raised portion respectively provided in each of the receiving slots in the embodiment of FIG. 7; and, FIG. 9 is a perspective view of still another alternate embodiment of the present invention wherein at least one connector is equipped with coaxial cable signal connectors and telephone signal module jacks.
Figure 9:
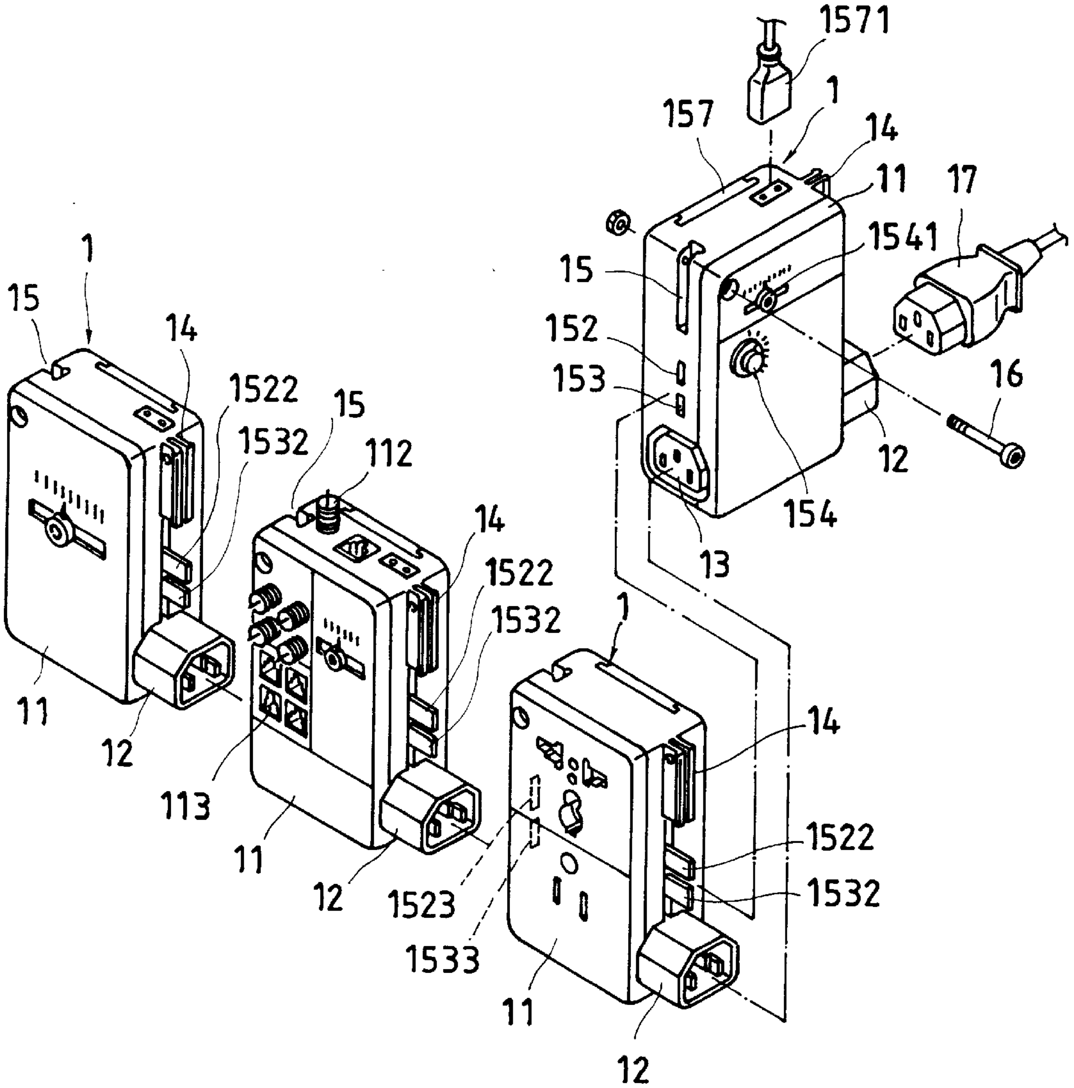

Referring to FIGS. 7, 8, and 9, in yet another alternate embodiment of the present invention, the electric connector comprises at its right side wall two parallel coupling plates 14 and an electric plug 12, as well as vertically aligned upper and lower receiving slots 15222 and 15322 disposed between the coupling plates 14 and the electric plug 12. The connector also comprises a first metal blade 1522 and second a metal blade 1532 respectively coupled in pivotal manner to the housing 1 to pivotally retract and extend in an out of their respective receiving slots 15222, 15322. A raised portion 15223, 15323 is formed on the inside wall of each receiving slot 15222, 15322 at one side for holding the given metal blade 1522, 1532 in the extended position.

When two electric connectors are fastened together, the metal blades 1522 and 1532 at one electric plug are respectively inserted into the insertion slots 152 and 153 at the other, and either a low voltage AC power supply or a high voltage AC power supply can be selectively transmitted from one electric plug to the other by setting the voltage regulator control 154 accordingly. Additionally, coaxial cable signal connectors 112 and telephone signal module jacks 113 may be provided at the housing 1 as shown.

It is to be understood that the drawings are intended for illustration purposes only, and are not intended for use as a definition of the limits and scope of the invention disclosed.

What is claimed is:

1. A universal connector system comprising:

a plurality of detachably connected electric connectors, each said electric connector including:

(a) a housing having front and back wall portions and a side wall portion extending therebetween, said sidewall portion having a plurality of sections;

(b) at least one electric plug coupled disposed at a first section of said housing side wall portion;

(c) power supply circuit means disposed within said housing and coupled to said electric plug;

(d) at least one electric receptacle disposed at a second section of said housing side wall portion; said electric receptacle being configured to matingly engage said electric plug of another said electric connector;

(e) at least one metal blade disposed at said first section of said housing side wall portion; and, (f) at least a first pair of spaced metal contact plates disposed within a first insertion slot formed in said second section of said housing side wall, said first pair of metal contact plates electrically coupling said electric receptacle to said power supply circuit means responsive to the engagement thereof by one said metal blade of another said electric connector;

at least one of said electric connectors further including in said power supply circuit means thereof a voltage transformer for converting an input signal received through said electric plug to a plurality of predetermined power supply output voltage signals;

at least one of said electric connectors further including: a first voltage regulator control disposed on said housing for selectively adjusting said voltage transformer; and, at least a second pair of spaced metal contact plates disposed within a second insertion slot formed in said second section of said housing side wall, said second pair of metal contact plates electrically coupling said electric receptacle to said power supply circuit means responsive to the engagement thereof by one said metal blade of another said electric connector;

whereby said electric receptacle of at least one of said electric connectors is selectively coupled to said power supply circuit means to receive therefrom one of said predetermined power supply output voltage signals.

2. The universal connector system as recited in claim 1, wherein at least one of said electric connectors further includes:

(a) a rectifier in said power supply circuit means thereof for electrically rectifying the input signal received through said electric plug from an AC signal to a DC signal;

(b) a second voltage regulator control disposed on said housing for selectively adjusting said rectifier; and, (c) a DC output jack disposed on said housing receiving the DC signal from said rectifier.

3. The universal connector system as recited in claim 1, wherein said predetermined power supply output voltage signals at said voltage transformer of at least one of said electric connectors include a low voltage AC signal and a high voltage AC signal.

4. The universal connector system as recited in claim 3, wherein at least one of said first pair of metal contact plates of at least one of said electric connectors receives said low voltage AC signal of said voltage transformer; and, at least one of said second pair of metal contact plates thereof receives said high voltage AC signal of said voltage transformer.

5. The universal connector system as recited in claim 4, wherein at least one of said electric connectors includes a pair of said metal blades disposed at said first section of said housing thereof, said metal blades being configured for respective engagement of said first and second pairs of metal contact plates of another said electric connector.

6. The universal connector system as recited in claim 1, wherein said metal blade is retractably coupled to said housing.

7. The universal connector system as recited in claim 6, wherein said metal blade is coupled to said housing in pivotally displaceable manner.

8. The universal connector system as recited in claim 1, wherein at least one said electric connector further comprises a plurality of auxiliary connection members disposed on said housing.

9. The universal connector system as recited in claim 8, wherein said auxiliary connection members include a second electric receptacle disposed at said front wall of said housing for receiving from said voltage transformer one of said predetermined power supply output voltage signals.

10. The universal connector system as recited in claim 8, wherein said auxiliary connection members include a pair of spaced metal frames disposed within a pair of electric plug insertion holes formed in said front wall of said housing for receiving from said voltage transformer one of said predetermined power supply output voltage signals.

11. The universal connector system as recited in claim 8, wherein said auxiliary connection members include coaxial cable signal connector means disposed at said front wall of said housing.

12. The universal connector system as recited in claim 8, wherein said auxiliary connection members include telephone signal module jack means disposed at said front wall of said housing.

13. The universal connector system as recited in claim 1, wherein at least one said electric connector further comprises:

(a) positive, negative, and ground metal contacts disposed within a recessed track formed in said back wall portion of said housing for collectively receiving from said voltage transformer one of said predetermined power supply output voltage signals; and, (b) a plug plate detachably engaging said recessed track and coupled to said positive, negative, and ground metal contacts.

14. The universal connector system as recited in claim 1, wherein each said electric connector further comprises:

(a) an elongate coupling hole formed in said side wall portion of said housing; and, (b) a pair of elongate coupling plates disposed on said side wall portion of said housing, said coupling plates being configured to lockingly engage said coupling hole of another said electric connector.

* * * * *